United States Patent
Daily et al.

(10) Patent No.: US 8,422,693 B1
(45) Date of Patent: Apr. 16, 2013

(54) GEO-CODED SPATIALIZED AUDIO IN VEHICLES

(75) Inventors: Michael J. Daily, Thousand Oaks, CA (US); Henry Lu, Carlsbad, CA (US); Kevin Martin, Oak Park, CA (US); Michael O'Neal, Oklahoma City, OK (US)

(73) Assignees: HRL Laboratories, LLC, Malibu, CA (US); General Motors Corporation, Detroit, MI (US)

( * ) Notice: Subject to any disclaimer, the term of this patent is extended or adjusted under 35 U.S.C. 154(b) by 2220 days.

(21) Appl. No.: 10/954,986

(22) Filed: Sep. 29, 2004

Related U.S. Application Data

(60) Provisional application No. 60/507,183, filed on Sep. 29, 2003.

(51) Int. Cl.
*H04B 1/00* (2006.01)

(52) U.S. Cl.
USPC ............................................ 381/86

(58) Field of Classification Search ............ 381/77–82, 381/86, 110; 700/94; 340/988, 996, 995.24; 701/211
See application file for complete search history.

(56) References Cited

U.S. PATENT DOCUMENTS

| | | | |
|---|---|---|---|
| 5,406,492 A | 4/1995 | Suzuki | 364/449 |
| 5,491,754 A | 2/1996 | Jot et al. | 381/63 |
| 5,521,981 A | 5/1996 | Gehring | 381/17 |
| 5,642,285 A | 6/1997 | Woo et al. | 364/449.7 |
| 5,694,162 A | 12/1997 | Freeny, Jr. | 348/12 |
| 5,757,929 A | 5/1998 | Wang et al. | 381/24 |
| 5,767,795 A | 6/1998 | Schaphorst | 340/988 |
| 5,854,843 A * | 12/1998 | Jacknin et al. | 381/309 |
| 6,060,993 A | 5/2000 | Cohen | 340/691.6 |
| 6,172,641 B1 * | 1/2001 | Millington | 701/211 |
| 6,307,941 B1 | 10/2001 | Tanner, Jr. et al. | 381/17 |
| 6,363,322 B1 * | 3/2002 | Millington | 701/211 |
| 7,480,619 B1 * | 1/2009 | Scott | 704/275 |

FOREIGN PATENT DOCUMENTS

| WO | 01/17298 A1 | 3/2001 |
|---|---|---|
| WO | WO0246700 A1 * | 6/2002 |

OTHER PUBLICATIONS

Azuma, R., et al., "Recent Advances in Augmented Reality," *IEEE Computer Graphics and Applications*, pp. 34-47 (Nov./Dec. 2001).
Feiner; S., et al., "Wearing It Out: First Steps Toward Mobile Augmented Reality Systems," *Mixed Reality: Merging Real and Virtual Worlds*, Chapter 20, Springer Verlag, pp. 363-377 (1999).
Kyriakakis, C., "Fundamental and Technological Limitations of Immersive Audio Systems," *Proceedings of the IEEE*, vol. 86, No. 5, pp. 941-951 (May 1998).
Scott-Young, S., "Seeing the Road Ahead," *GPS World*, 5 pages total (Nov. 1, 2003).

* cited by examiner

*Primary Examiner* — Ping Lee
(74) *Attorney, Agent, or Firm* — Ladas & Parry

(57) ABSTRACT

A three dimensional audio playback system in which the audio clips are determined by location. The audio playback system being located within a vehicle to aid in navigation or for entertainment or informational or safety purposes.

29 Claims, 7 Drawing Sheets

Two approaches

Pull

Intent
- Driver asks for audio

Gaze
- Driver's head orientation indicates interest points

Push

Distance
- Audio plays when user is within specified distance

Direction of travel
- Audio in front plays (Doppler effect as it goes by)

Priority, round-robin
- Audio plays sequentially based on driver assigned priority

Figure 4

GEO-CODED SPATIALIZED AUDIO IN VEHICLES

CROSS REFERENCE TO RELATED APPLICATIONS

This application claims the benefit of U.S. Provisional Application No. 60/507,183 filed Sep. 29, 2003, the disclosure of which is hereby incorporated herein by reference.

BACKGROUND OF THE INVENTION

1. Field of the Invention

The present invention relates to a vehicle system for spatialized audio playback based on the location of the vehicle. The present invention relates to the presentation of sound in a vehicle where it is desirable for the listener to perceive one or more sounds as coming from specified three-dimensional spatial locations and the presentation of the sound is determined based on the location of the vehicle.

2. Description of Related Art

Consumers continually demand increased access to information, especially while in their vehicles. The anticipation of providing a wider array of in-vehicle "infotainment" options for drivers has resulted in more sophisticated sound systems, i.e. seven to eleven speaker arrays and "intelligent" equalization features; increased information bandwidth, i.e. multichannel XM® satellite radio and Onstar® cellular data link; and telematics systems, i.e. GPS-based navigation systems. Of course, automobile consumers are not the only ones interested in increased access to information. The military also has needs for navigation assistance within an immersive battlefield visualization; damage control assistance (locating problems); and object detection and tracking.

Current systems, such as the system disclosed in U.S. Pat. No. 5,767,795, enable information to be presented to an operator of a vehicle using either a video or audio clues that are presented based on the location of the vehicle. However, the visual clues may be a distraction to the operator of the vehicle and cause the operator to move his attention from the roadway and other vehicles to the visual clues, thereby causing an increase risk to the safety of the driver. In addition, the audio clues are limited to those provided by a data storage means such as a CD-ROM. Further, the audio clues provided in vehicle systems today do not utilize various audio components within the vehicle to provide additional information.

The related art also includes the following:
1. U.S. Pat. No. 5,491,754: Method and system for artificial spatialization of digital audio signals. This system lays the groundwork for synthetically spatializing audio using multisource signal delays. It does not address geo-coded audio or the use of such in a vehicle.
2. U.S. Pat. No. 5,521,981: Sound Positioner. A system for presenting binaural sound to a listener with the desired effect of the perception of the sound coming from specified three-dimensional spatial locations. The spatial positioning parameters are adjustable in real time but do not involve geo-coded locations of interest as used in a vehicle.
3. U.S. Pat. No. 5,757,929: Audio interface garment and communication system for use therewith. This system utilizes user wearable arrays of microphones and speakers and digital transceivers. The system provides for spatialized audio output to nearby recipients and/or listening in to audio coming from selected directions and/or peers. It does not address geo-coded audio or the use of such in a vehicle.
4. U.S. Pat. No. 5,767,795: GPS-based information system for vehicles. This system enables information to be presented to a driver using either a video display or audio. It does not address the issue of spatialized playback based on location.
5. U.S. Pat. No. 5,642,285: Outdoor movie camera GPS-position and time code data-logging for special effects production. This system enables post-production use of position with video for special effects and animation. It does not address the problem of correct playback based on current location or three dimensional audio capability.
6. U.S. Pat. No. 6,060,993: Mobile display system. This system enables a mobile display of a message to update based on position (e.g. for advertisement), but does not teach spatialized audio with location.
7. Azuma, R., Y. Baillot, R. Behringer, S. Feiner, S. Julier, B. MacIntyre. "Recent Advances in Augmented Reality," IEEE Computer Graphics and Applications vol. 21, #6 (November/December 2001) pp. 34-47.
8. Feiner, S., B. MacIntyre, and T. Höllerer. 1999. Wearing it Out: First Steps Toward Mobile Augmented Reality Systems, In: Y. Ohta and H. Tamura (eds.): Mixed Reality: Merging Real and Virtual Worlds, Ohmsha (Tokyo)—Springer Verlag, pp. 363-377, http://wwvv.cs.ucsb.edu/~holl/pubs/feiner-1999-ismr.pdf.
9. Scott-Young, S., "Seeing the Road Ahead," GPS World, Nov. 1, 2003.
10. Kyriakakis, C., "Fundamental and Technological Limitations of Immersive Audio Systems," IEEE Proceedings, vol. 86, pp. 941-951, 1998.

SUMMARY OF THE PRESENT DISCLOSURE

The system disclosed herein provides for a new and unique driver interface to information and navigation data which could be integrated into many commercial vehicle product lines. In addition, the system disclosed herein allows for enhanced presentation of vehicle diagnostic/safety information, navigation system cues, and other types of audio and location-based information including user provided data through other vehicles, the Internet, or the World Wide Web. This invention may be integrated with current or emerging information/infotainment technologies such as XM® satellite radio, Onstar® cellular data link, and telemeatics systems, such as GPS-based navigation systems.

In general, this system could be implemented (and used to augment visual displays) within any acoustically-permissible environment (including military ground vehicles, aircraft cockpits and naval vessels) where location-based information can be retrieved. Examples of uses include: acoustic cues for assisting navigation within an immersive battlefield visualization; damage control (locating problems); and object detection and tracking.

One embodiment of the present invention is an audio system comprising; a position sensor, said position sensor providing a current position vector; a database for storing a plurality of data formats, wherein each data format is associated with an associated position vector, an associated orientation vector, and an associated time vector, said database receiving said current position vector and providing a selected set of data items from said plurality of data items based on said current position vector; an audio processing unit, said audio processing unit receiving the selected set of data items and generating a spatialized audio cue for each data item in said selected set of data formats; and a plurality of speakers, said plurality of speakers providing said spatialized audio cue to a user.

Another embodiment of the present invention is a new and unique user interface to information and navigation data which could be integrated into a variety of different modes of transportation, including, but not limited to, personal vehicles, trains, aircraft, military vehicles of all types and naval vessels.

BRIEF DESCRIPTION OF THE DRAWINGS

FIG. 4 depicts 'push' and 'pull' approaches for obtaining spatial data;

DETAILED DESCRIPTION OF PREFERRED EMBODIMENTS

I. Overview

The present invention utilizes both hardware and software components in order to provide spatialized audio cues to an operator of a vehicle. In general, in one embodiment, the present invention provides a user interface to an operator of a vehicle. The user may select points of interest from a menu of audio categories that might include street/traffic signs, restaurants, landmarks, gas stations and other points of interest. For example, the driver of the vehicle is going from home to a McDonalds® restaurant and the driver has selected street signs and McDonalds® restaurants as the points of interest. Each of the points of interest has an audio cue with an associated position. As the user approaches an intersection, driving instructions will sound from the correct direction of travel (i.e. turning directions spatialized to a street location). For example, 1/10 of a mile before the intersection, the directions "Turn Left onto Main Street" will be emitted from a vehicle speaker to the left of the user. As the user approaches a location associated with the selected point of interest, an audio token is rendered so the sound appears to originate at the location's position in the real world. For example, when the user is within 1/10 of a mile of a McDonald's® restaurant, an audio cue will sound from the left front speaker indicating that a McDonalds® restaurant is ahead on the left. The audio cue can be a jingle (perhaps one related to, in this case, McDonalds® restaurants), or other audio message or sound. If the restaurant were instead on the right hand side of the vehicle, then the audio cue will sound from the right front speaker instead.

Other possible uses for spatialized audio in a vehicular environment include the following:

(i) Spatial diagnostic and safety warnings—for example, a "door open" or "door ajar" safety warning can originate from the location of the door which is ajar or open or an obstacle warning can originate from the location of the obstacle.

(ii) Spatial inter-vehicular communications—for example, if you are talking with a person in a vehicle located to the rear of your vehicle, then their voice can be made to originate from a location to your rear.

(iii) Virtual passengers, and/or (iv) Spatialized telephone conversations.

II. Hardware

Figure 1:
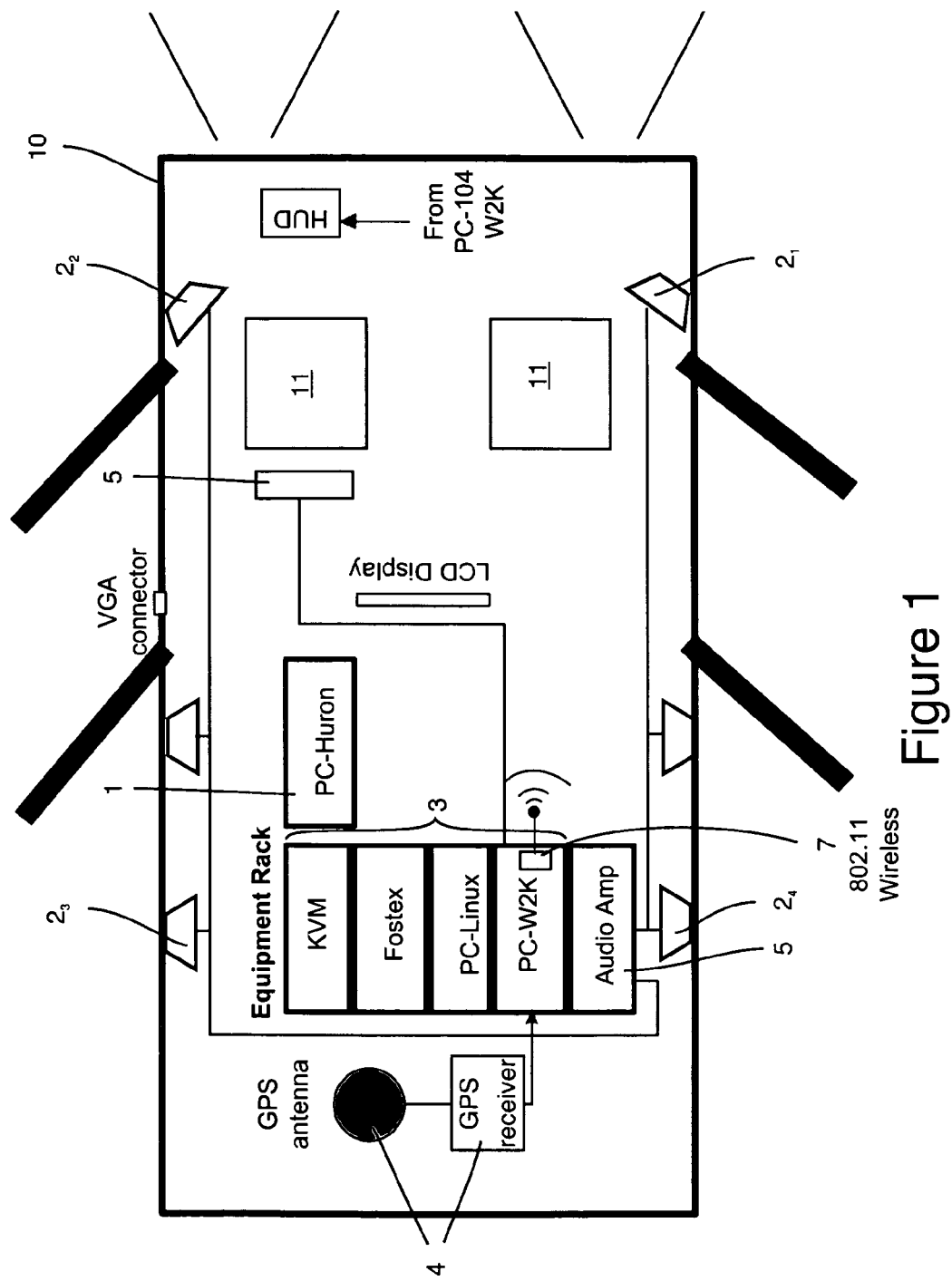
FIG. 1 depicts one embodiment of the present invention located within a vehicle.

FIG. 1 depicts one possible embodiment of the hardware components of an audio system in accordance with the present disclosure, the audio system being placed in a vehicle 10 such as a GMC Yukon; however, the system may be configured to operate in any vehicle with minor modifications. The driver's and passenger's seats are represented at numeral 11 and the vehicles lights and doors are represented very diagrammically. If desired, the hardware embodiment may be simplified, so as to use fewer components, for example, by making the components perform multiple tasks or, as discussed below, by eliminating certain tasks and/or features.

Figure 3:
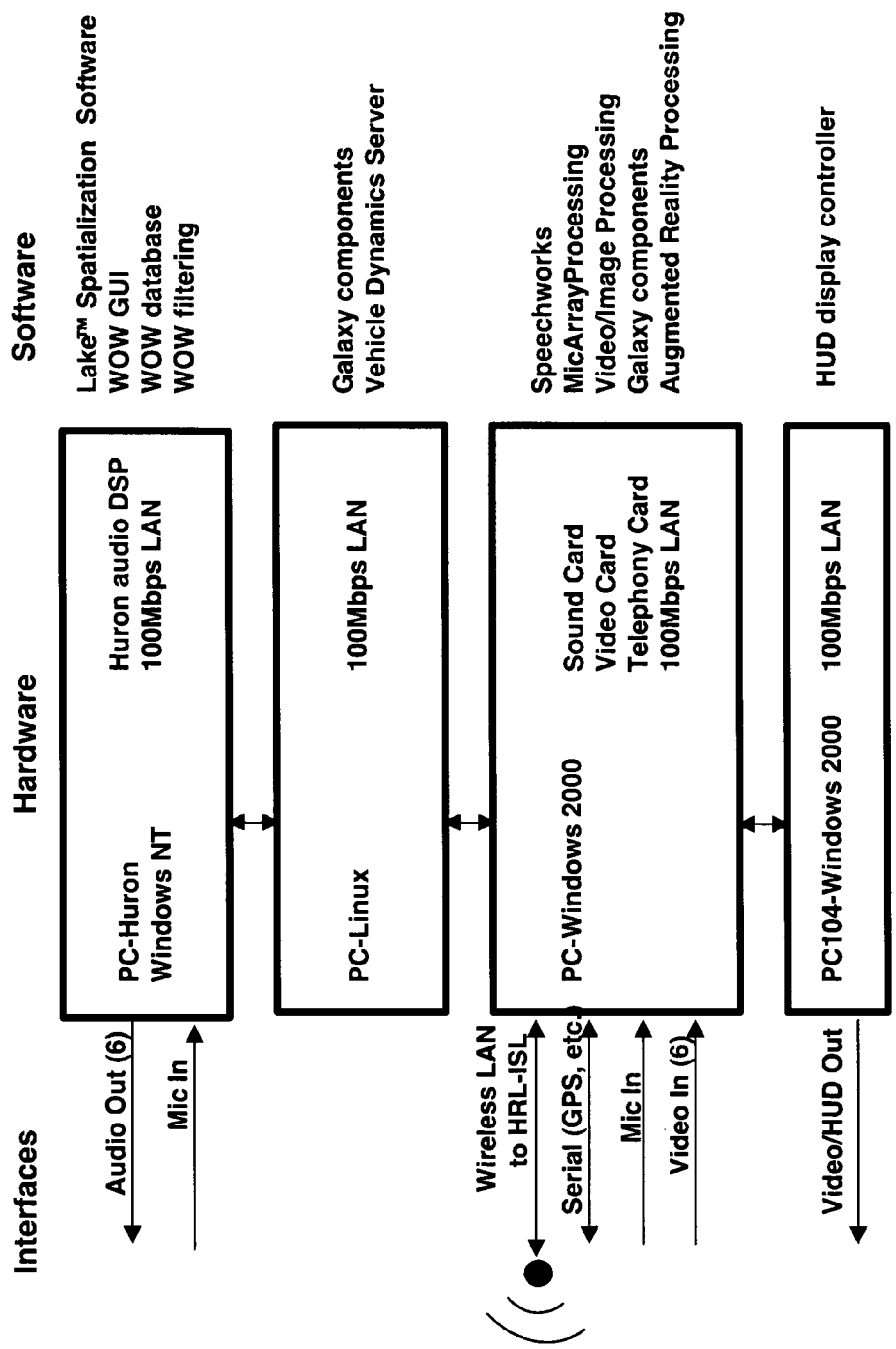
FIG. 3 identifies, in greater detail, the equipment used in the proof of concept test vehicle.

FIG. 1 identifies certain equipment used in a proof of concept test of the present invention. The equipment used in an actual commercial embodiment would preferably be simplified in order to reduce its cost and would not need all of the equipment shown in FIG. 1. The logic units are shown in even greater detail in FIG. 3.

The basic hardware components of the disclosed audio system are an audio spatialization unit 1, a position sensor 4, logic units 3 and audio components 5. The position sensor 4 and audio components 5 (including speakers 2) are connected to the audio spatialization unit 1 and the logic units 3. In general, the logic and audio spatialization units 1, 3 receive the real-time position data from the position sensor 4 and provides spatialized audio signals based on software filters, discussed herein, to the audio components, thereby providing spatialized audio to the user. One skilled in the art will appreciate that the required audio components depend upon the number and types of speakers as well as the configuration of the speakers. Further, the number and types of speakers and their configuration depend upon the size and shape of the vehicle. See also FIG. 3. In the proof of concept test vehicle, a keyboard video mouse (KVM) switch was used as was a Fostex 8 track digital recorder for recording the digital earcons and a LCD display for programming, control and testing purposes.

The audio spatialization unit 1 may be implemented by a general purpose computer/microprocessor equipped with a dedicated hardware bus, digital signal processing hardware, and input/output (I/O) hardware. The general purpose computer/microprocessor is preferably powered through the vehicle's battery. The audio spatialization unit 1 also preferably comprises signal processing and audio simulation software running on the computer hardware. The signal processing and audio simulation software preferably providing for audio spatialization, audio mixing, signal convolution, impulse response recording, I/O control, and equalization, etc. Additionally digital signal processing (DSP) engines may be coupled to the audio spatialization unit 1. The DSP engines preferably have programmable capabilities for filtering, equalization, crossover, compression, mixing, speaker delays, and pink noise reduction. The DSP engine is preferably co-located with the aforementioned computer hardware in the vehicle.

The audio spatialization unit 1 is preferably coupled to a plurality of speakers 2 surrounding the user to provide for spatialization effects. Any number of speakers 2 can also be placed above or below the plane of the listener's head to enhance the capability of vertical spatialization, otherwise known as "height" channels. One or more sub-woofers 3 are optionally used to playback low frequency components of the audio. In one embodiment at least four speakers 2 are used. The speakers 2 are arranged with speaker $2_1$ being placed forward and to the left of the listener, speaker $2_2$ being placed forward and to the right of the listener, speaker $2_3$ being placed rearward and to the left of the listener, and speaker $2_4$ being placed rearward and to the right of the listener. One skilled in the art will appreciate that the exact placement of the speakers is highly dependent upon the environment in which the system will operate. In a vehicle, for example, given the vehicle's interior somewhat irregular shape, the composition of materials with different acoustic properties (glass is reflective, whereas upholstery is absorptive), and inherent driving noise (from wind, engine, windshield wipers, A/C, etc.) effect the ability to spatialize audio and therefor additional speakers 2 may be used to help spatialize the audio and/or a subwoofer may be used to help improve sound quality. Measurements of the acoustic environment of the vehicle under various driving conditions and installation of acoustic treatment based on those measurements may be utilized to mitigate effects of the vehicle shape and composition. In addition, it is possible that the audio that is to be spatialized could be selected/processed so that the effects of driving nose are also minimized. This can be done by using one or more microphones placed to pick up ambient noise (road noise, engine noise, etc) and then using the outputs of such microphone(s) as a negative term (i.e. 180° out of phase) to the ambient noise to thereby reduce it.

The audio spatialization unit 1 is also preferably connected to a position sensor 4. Position sensor 4 may be a GPS receiver, a map matching system, or other vehicle navigation system. The software system running on the audio spatialization unit 1 receives a current position from the position sensor 4. For example, the real-time GPS position is obtained from a GPS receiver located in the vehicle as the vehicle moves through an area. The software system utilizes the current position provided by the position sensor 4 in determining the audio cues, herein referred to as audio clips to be played.

III. Software

Figure 2:
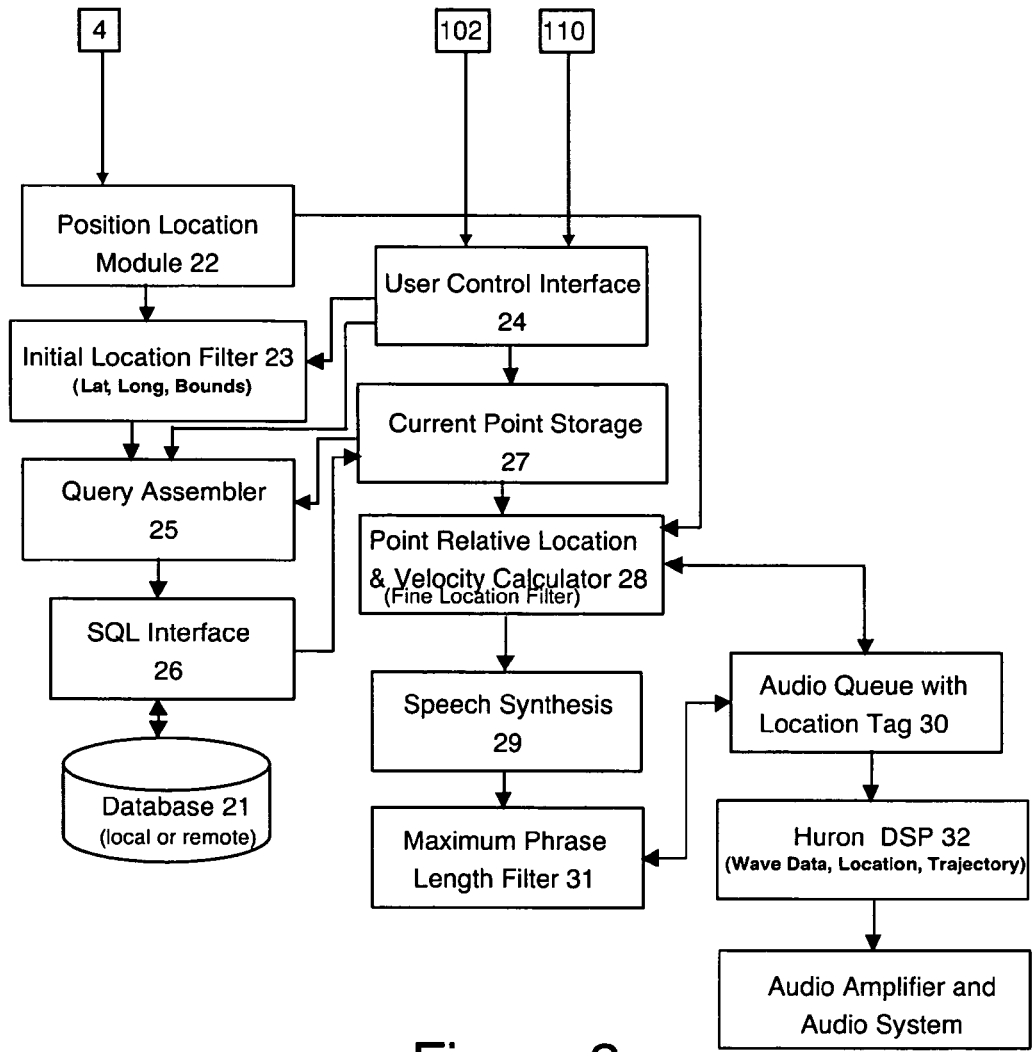
FIG. 2 depicts one embodiment of the software architecture and Data Flow utilized in the present invention.

FIG. 2 depicts one embodiment of software modules that may be used in the disclosed audio system. In general, the software component receives a real-time position from the position sensor 4 (see also FIG. 1). The software component utilizes the real-time position and the user input from a User Control Interface 24 to determine which audio cues to provide to the user. The software component then provides the audio cues to the audio spatialization unit 1 for spatialization and presentation to the user.

Figure 5:
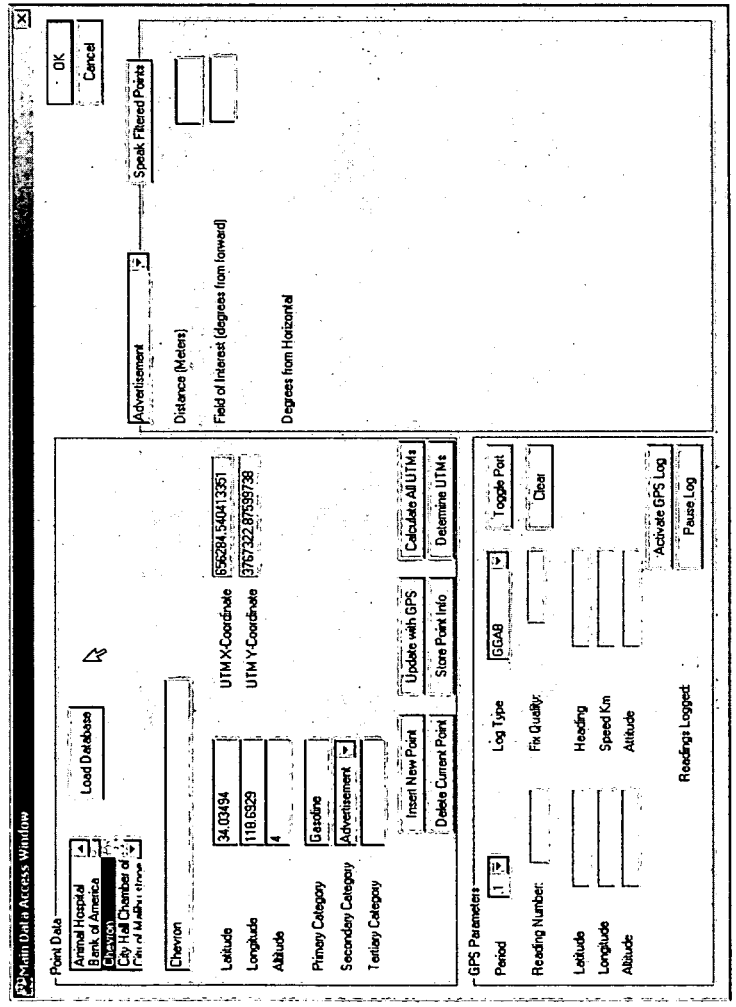
FIG. 5 depicts a graphical user interface for collecting, categorizing, filtering, and playing back spatialized audio in a vehicle.

The audio clips are preferably stored in a database 21 located in the logic unit 3 (see FIG. 5). The database 21 contains the actual position information (for example, in latitude and longitude terms) associated with each audio clip or text to be converted to audio. The orientation (e.g. the relative location of the point of interest relative to the vehicle) and the travel time to point of interest can be easily calculated knowing the location of the landmark (a restaurant, for example) and the vehicle's present location and speed and direction of travel. The database may also store information regarding the length of the message (an audio clip or text to be converted to a voice message). FIG. 2 details the sequence of operations and data flow used to select audio clips for location-based playback. A Position Sensor Location Module 22 interfaces with the position sensor 4 and processes the real-time position data provided by the position sensor 4. The Position Location Module 22 passes the processed position data, such as current position, to an Initial Location Filter 23, which selects latitude and longitude bounds for queries to be made to the database 21 by the Query Assembler 25.

A User Control Interface 24 allows a user to activate different filter types, such as push and pull filters, set categories or genres of audio clips to choose from, set minimum priority levels, set the time interval between message repeats, set radial distance for push type messages, set angular range for push type messages, and prioritize or activate filters. FIG. 4 identifies the types of messages which the push and pull filters might generate. The push and pull filters provide two different approaches for supplying information to the driver and they are can used together or separately, as desired. FIG. 5 is an example of a graphical user interface for collecting, categorizing, filtering and playing back spatialized audio in a vehicle using a GPS receiver for position sensing. Push filters play a spatial audio element from the database 21 based on criteria such as distance to the object, velocity, and/or direction of travel. Pull filters utilize actions of the driver such as explicit (and preferably verbal) commands such as "Find fast food restaurants within 2 miles", or "What is that?" combined with a head gaze direction (for example) as an indicator of driver interest.

A variety of different types of categories or genres may be considered, for example, advertisements, banks, deluxe sit down restaurants, simple sit down restaurants, fast food restaurants, emergency facilities, gasoline stations, insurance agency, mandatory audio clips, recommendation audio clips, stock broker, street, and safety warnings. The Initial Location Filter 23 receives data from the User Control Interface 24 and the Position Location Module 22 and determines latitudinal and longitudinal bounds (roughly square area) used in selecting the audio clips from the database 21.

The Query Assembler 25 receives the latitudinal and longitudinal bounds from the Initial Location Filter 23 and utilizes data received from the User Control Interface 24 to construct a query. In one embodiment of the present invention, Structured Query Language (SQL) is preferably used to interface with a MySQL database. MySQL database is an open source database; however, one skilled in the art will appreciate that other query languages and other databases, whether SQL-based or otherwise, may be used instead. Indeed, it may be preferable to integrate the disclosed system with a geo-spatial database such as the databases made by ESRI of Redlands, Calif. An advantage of using a geo-spatial database is that it is designed to facilitate quires of a spatial nature.

Now consider the sort of information which might be retrieved from the database 21. In one example, assume that the user has specified that he or she is interested in a category called restaurants. The selected category of restaurants plus the latitudinal and longitudinal boundary data is passed to the Query Assembler 25. The Query Assembler 25 then constructs a database query. The database may be a SQL database, such as a MySQL database, and the SQL query is passed to the SQL Interface 26 which sends the completed query to the database 21. The SQL database 21 then processes the SQL query and returns to the SQL Interface 26 the one or more audio clips that (i) are associated with the category "restaurants" and (ii) whose associated position(s) is(are) within the latitudinal and longitudinal bounds provided by the Initial Location Filter 23. The SQL Interface 26 receives the results of the SQL query from the SQL database 21 and sends the associated audio clip(s) to a Current Point Storage 27. In the foregoing example, it is assumed that the query is the first query made by the Query Assembler 25, and thus there are no audio clips previously stored or pending in the Current Point Storage 27. If there are audio clips stored or pending in the Current Point Storage 27, the Query Assembler 25 preferably excludes the audio clips currently stored in the Current Point Storage 27 from the results of the query. The exclusion of the audio clips currently stored in the Current Point Storage 27 from the results of the query prevents redundant transfer of data from the database to the user via the Current Point Storage 27, providing for optimization of the audio playback system and keeping repetitious audio clips from being played for the user more frequently than is desired by the user.

Otherwise, the Current Point Storage 27 preferably adds the set of audio clips returned through the SQL interface 26 in response to the query to those already being stored. It should be noted that "pull" queries may be handled differently than are "push" according to the user's preferences. For example, if the driver (or other user) asks for fast food restaurants and is speeding along an interstate highway, the driver may well wish to hear something like "There is a hamburger restaurant 10 miles ahead and a fried chicken restaurant 17 miles ahead. At your present rate of travel, you will see them in 8.5 and 13 minutes, respectively." Thus, for a "pull" query, the system may be set up to respond immediately with a report and will likely have a larger bounds (latitude and longitude bounds) than would a simple "push" query. For "push" and "pull" queries, the system responds (according to the user's preferences) as the vehicle approaches the landmark associated with the query.

Next, the Current Point Storage 27 cyclically checks the position and message time data associated with the audio clips stored in the Current Point Storage 27 using the location and velocity calculations. Since audio clips could take several seconds to complete, the current position and rate of travel are preferably taken into consideration when selecting audio clips. By taking into account the current position and rate of travel, the playback of the audio will be completed while the point of interest is within reasonable range of the vehicle to be of use to the listener. Therefore, the Current Point Storage 27 preferably deletes from its storage any audio clips that can not be played before the vehicle moves out of reasonable range of the point (or landmark) of interest. The Current Point Storage 27 then sends the remaining audio clip that have not played in the last N seconds onto a Speech Engine 29. N is a variable number, set by the user through the User Control Interface 24, which corresponds to a period of time, measured in seconds, which must occur before a message repeats itself. The Current Point Storage 27 preferably send a list of the current audio clips to the Query Assembler 25 for exclusion from the next query, as discussed above. Alternatively, duplicate queries could be simply ignored (i.e. deleted from the Current Point Storage 27) when they occur.

A Point Relative Location and Velocity Calculator 28 calculates location, velocity and angular displacement of the audio clues relative to the current position and orientation of the car. It obtains the vehicle's current position, velocity and travel direction information from the Position Location Module 22.

The Speech Synthesis/Speech Generator Engine 29 receives the audio clips from the Current Point Storage 27, which are passed along by the Point Relative Location and Velocity Calculator 28, and renders audible descriptions of the audio clips to an Audio Queue 30. The Speech Engine 29 also passes rendered audio to a Maximum Phrase Length Filter 31. The Maximum Phrase Length Filter 31 filters out rendered audio over a hard-coded temporal length. If the message length is stored as a value in the database, then the Maximum Phrase Length Filter 31 may well be unneeded or, if provide, be seldom utilized. However, if the message length is not stored as a value in the database, then the Maximum Phrase Length Filter 31 can keep unduly long messages from reaching the driver.

The Audio Queue 30 stores audio clips until a voice channel provided by the audio spatialization unit 1 is available. The Audio Queue 30 receives position updates for each of the audio clips from the Point Relative Location and Velocity Calculator (or Fine Location Filter) 28 preferably ten times per second. The Audio Queue 30 sends the updates for each of the audio clips to the Digital Signal Processor (DSP) 32 responsible for the control of the voice channels. The Audio Queue 30 also sends an Audio Trigger, which is a signal indicating that than an audio clip has passed all the processing and filtering needed in earlier stages of the system and now should be played. The Windows Sockets 32 provide for the spatialization of the audio clips in accordance with the position and orientation updates received from the Audio Queue 30. The DSP 32 determine to which speakers the sound will be sent, relying on the position and orientation of the vehicle in relation to the position estimate and orientation estimate associated with the audio clip.

In the preferred embodiment a Huron DSP manufactured by Lake Technology provides DSP 32. The Huron DSP 32 contains software libraries that enable lower level access to the DSP hardware for spatialization. Functions that are enabled though the use of these libraries include: (i) low frequency mixer (e.g. the "0.1" in a 6.1 channel system); multiple channel volume control; virtual rack for audio components; (ii) PatchBay (for connections between the Huron DSP functions and the physical speaker outputs); (iii) Locator (for a 2-D graphical display of listener and virtual audio sources); and (iv) SpaceArray (speaker location definitions and real-time numeric sound location display).

For additional information regarding the software modules which preferably comprise the system, see table I below.

TABLE I

Detailed function of the various software modules which may be used.

| Software Module | Function(s) |
| --- | --- |
| Position Location 22 | Sets up communications with the position sensing system and processes position (e.g. GPS) output. |
| Coarse Location Filter 23 | Selects latitude and longitude bounding box from which to choose candidate points. |
| Query Assembler 25 | Constructs an SQL query from filter settings and Lat/Long bounding square. Excludes points being stored within the program as current points from query. |
| Query Interface 26 | Sends the completed query to the MySQL database. Receives results of SQL query. Sends points returned by the database to the current point storage. |
| Database 21 | Processes SQL queries and returns points matching query criteria. |
| User Control Interface 24 | Activates different filter types. Sets categories, genres of points to choose from. Sets min. priority levels. Sets radial distance. Sets angular range (from forward). Prioritizes filters. |

TABLE I-continued

Detailed function of the various software modules which may be used.

| Software Module | Function(s) |
| --- | --- |
| Current Point Storage 27 | Adds set of points returned from the query interface to cache. Checks all points using the relative point location and velocity calculations. Deletes points that don't pass location/angle/velocity filter criteria. Sends points that haven't played in x seconds to the speech engine. Sends a list of the current points to the query assembler for exclusion from the next query. |
| Fine Location Filter 28 | Calculates location, velocity, and angular displacement of points relative to the current position and orientation of the car. |
| Speech Synthesis 29 | Renders descriptions of points to audio buffer. Passes rendered audio to the maximum phrase length filter. |
| Max. Phrase Temporal Length Filter 31 | Filters out rendered audio over a hard-coded (or possibly relative position dependent) temporal length. |
| Audio Queue 30 | Stores audio samples until a voice channel is available for output, Sends audio to the DSP. Obtains position updates from the fine location filter. Sends updated position and velocity information to the DSP. Sends Audio Trigger. |
| DSP 32 | Renders spatial audio object description. |

The software playback system described above provides for enhancement of the audio or text to speech experience. Possible further enhancements include spatially registered audio effects such as audio icons, also known as earcons. An earcon is a nonverbal audio message or icon used to provide information to the user about some event, operation, or interaction. For example, instead of the audio system playing the speech message "You have arrived at your destination", an earcon, such as a trumpet sound, could be used to signify that the destination has been reached. In addition, the audio may be pre-processed to enable functions such as language translation and varied playback speeds. The input audio may be any standard audio (e.g. WAV, AIFF) or text converted to speech via a text to speech process (e.g. SpeechWorks's Speechify, Microsoft Text to Speech, Festival, etc.). In order to enable real time update, the Current Point Storage 27 may store the audio clips in cache that is preferably organized as a hash table where the hash function is indexed using the position estimates associated with the audio clips.

IV. Audio Whiteboard

Optional enhancements to the audio system disclosed above include an audio whiteboard where the database is distributed across a network including wireless elements, audio transparency where live external sounds are filtered and amplified, cell-phone or virtual conversations that are spatialized to the passenger seat (or other location), and spatialized vehicle safety and diagnostic warnings.

The audio whiteboard feature enables both vehicle and non-vehicle based users to asynchronously share and exchange audio tags that are position coded to specific locations. As depicted in FIG. 1, an additional wireless transceiver (which may be an IEEE 802.11 type port to the Internet) 7 is preferably coupled to the logic unit 3 to provide for the added functionality of sharing and exchanging audio tags. A vehicle-based user, for example in a car 1, would typically send an audio message, via the wireless transceiver 7, with its associated position estimate to another vehicle based user, i.e., in a car 2. The associated position estimate would be determined by the location of the vehicle (car 1) at the time the message was recorded. The other vehicle (car 2) receiving the message, via the wireless transceiver 7, would then play the message when the other vehicle (car 2) reached a predetermined position based on user selection and the position estimate associated with the message. The message could be a simple navigational cue such as "we're getting off at the next exit", or a reminder to one's self such as "remember to pick up some milk at the market on the way home". Non-vehicle based users may use web-interfaces, e-mail, or voice systems to send position coded messages to individuals or groups of subscribers. One skilled in the art will appreciate that there are many details involved in implementing a wireless network, and these details, such as subscriber IDs, cell size, etc would need to be addressed. A further option that may be used with the addition of the wireless transceiver 7 is distributing the database that holds these audio cues across the Internet or picking up the audio cues from roadside information kiosks or networks.

Figure 7:
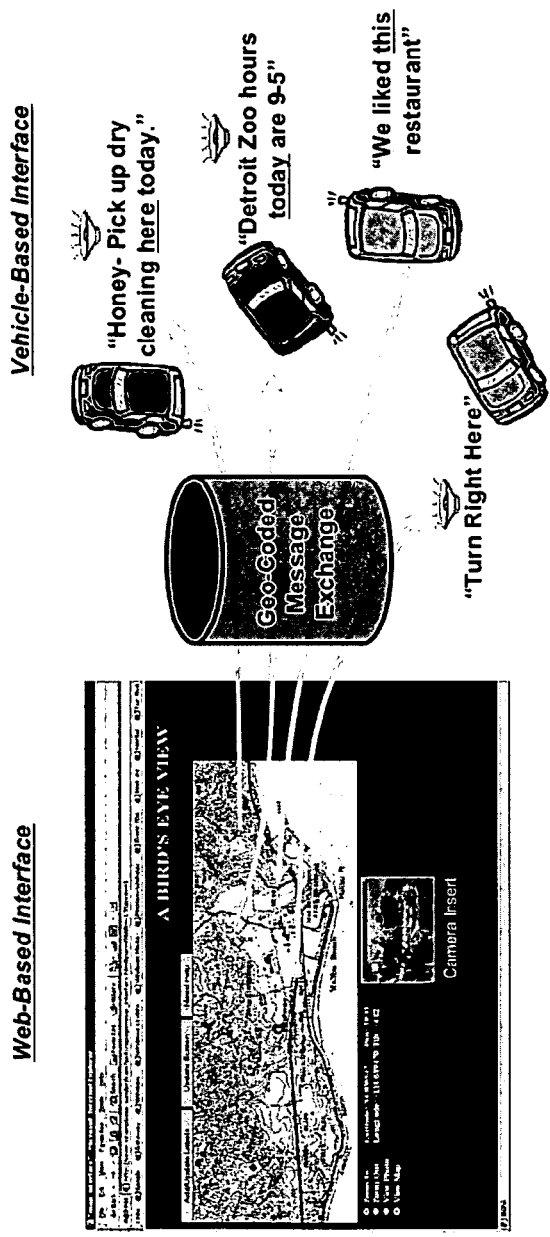
FIG. 7 depicts the concept behind an audio whiteboard.

One method of populating the database 21 is enabled through the use of the aforementioned whiteboard system. FIG. 7 depicts the concept behind the whiteboard, where a variety of different modes are used to construct geo-coded audio, and potentially video, messages and then use the vehicle-based system (or a browser) to access them asynchronously. Both mobile and fixed users can add location specific information to a distributed web-based server that is then accessible by users based on a variety of location-based queries. The whiteboard allows the user to annotate places with audio in real time, that is then stored in a remote server and can be accessed remotely from fixed systems or as the user moves to new locations or points in the direction of previously annotated objects or places.

Figure 8:
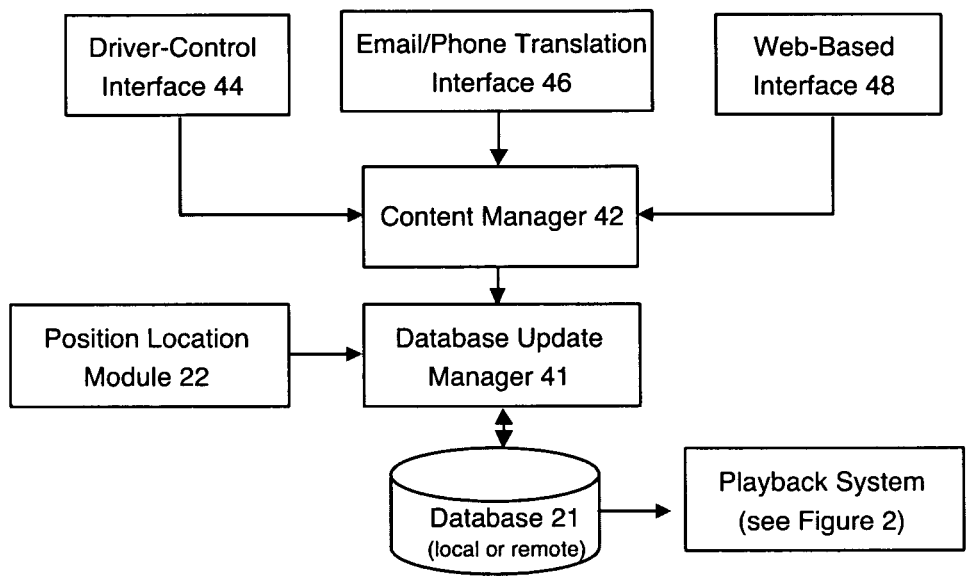
FIG. 8 depicts a system architecture for the audio whiteboard.

FIG. 8 shows a possible system architecture for the Audio Whiteboard. The Geo-Coded Message Exchange consists of several interface modules that communicate to a content manager 42. Proof of concept versions of the driver control interface 44 have been implemented, as have a web-based interface 48, and a phone interface 46, but an email translation portion of interface 46 has not yet been implemented. In the case where the driver wants to place information on the whiteboard, the system uses position information from the position location module 22 to location and time stamp the driver's spoken comment. The spoken comment may be saved as a .wav file, but with the use of voice recognition capability discussed below, the spoken comment could be transformed into a character (textual) representation. A textual representation would likely assist in subjecting the comments to content filtering by another user so that the another user can avoid listening to audio comments which the another user might find objectionable and/or irrelevant.

In the case of the web-based interface 48, the user interacts with a map or satellite image of the area by selecting a point and typing or speaking the content to be associated with that location. The interface 48 then constructs a token with time and location stamp and sends it on to the content manager 42. The email/phone translation interface 46 is similar, except that it requires the user to place a location into the message where the information should be associated. In the case of email, this may be awkward without the use of a map or pre-defined list of locations with latitude and longitude. The phone-based interface currently requires a GPS capable or compatible phone.

Once the interface has constructed an item of the form defined for the audio database, the content manager 42 decides where to store the contents in a distributed system (such as the Internet), and sends the item or a link to the database update manager 41 which actually adds an item to the database 21 (remote and/or local database). The playback system then functions as described previously with respect to FIG. 2. An important aspect of the playback system is its ability to filter items from the whiteboard based on user preferences and categories of information, thus avoiding a rash of audio "graffiti" the driver does not have an interest in.

V. Audio Transparency

The audio transparency feature enables external sounds to be filtered and/or amplified. Unwanted road noises such as construction or traffic engine drone could be eliminated. Important safety and navigational sounds could be allowed to pass through and amplified and spatialized to provide better cognitive awareness for the driver. Optional sounds determined to be desirable to by the driver might also be allowed to pass through unfiltered (e.g. birds signing, ocean waves crashing, etc.). As previously indicated, a microphone would be used to pick up this information.

The virtual conversation embodiment enables one or more cell phone conversations to be spatialized in physical locations throughout the car. For example, a single voice might be placed in the front passenger seat, while more voices would be distributed over the back passenger seats. With this type of separation, the driver can more easily keep track of who is talking. In this embodiment the cell phone signal would need to pass through the audio spatialization unit 1. In addition, software modules would need to be added to enable the system to differentiate between the different voices being received by the cell phone. A cellular telephone with the ability to simultaneously handle multiple calls would be needed.

VI. Vehicular Warning and Safety Information

The spatialized vehicle safety and diagnostic warning embodiment enables audio warning cues and diagnostic information to be heard in the location that is appropriate for the message. For instance, collision warning, hydo-planing warning or low tire inflation audio messages could be heard from the direction of that the safety hazard is occurring. Diagnostic cues such as "door ajar" could be heard from the location of interest. In this embodiment the audio spatialization unit 1 would need to be connected with the vehicle's computer. The vehicle's computer would be responsible for monitoring the collision warning sensors, tire inflation, and other operational information. The vehicle's computer would then pass this operational information on to the audio spatialization unit 1 for processing in accordance with the description given above. Modern automobiles typically have sensors installed to detect various safety matters, such as a door which is not locked securely. By coupling the typical vehicular warning system in the present system, the warnings can be appropriately spatialized when delivered to the driver.

Safety information of importance to other drivers, such as a hydro-planing warning, could be shared with users in other vehicles in a close proximity to the vehicle in which the warning arose by utilizing the whiteboard embodiment discussed above. In this case, the audio comment, instead of being from a human user, could be automatically supplied as a prerecorded or predetermined sound or textual data to drivers in other vehicles.

VII. Additional Features and Further Improvements

Figure 6:
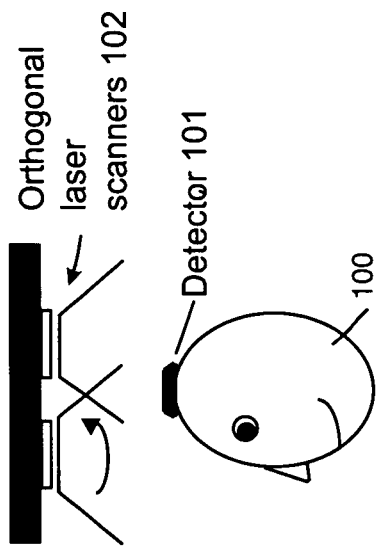
FIG. 6 depicts an optional head tracking system.

A. Human head tracking (See FIG. 6). Tracking the position of the users (say the driver's) head can provide very useful information to the previously described system. In FIG. 6 the head of a user (driver) is denoted by numeral 100. For simplicities sake, the user is assumed to be wearing a detector or a reflector 101 which provides information to a laser system 102 regarding the position of the user's head 100. The laser system provides information regarding changes in the user's head position to User Control Interface 24. If the position of the user's head 100 is known, then the spatialization can be done more accurately. But perhaps even more importantly, the head tracking system should be able to detect head gestures such as a "yes" or "no" gesture which the user might respond to an inquiry (in the form of an audio clip) and depending upon the user response, another audio clip might be played. For example, if the user is looking for a particular restaurant, then the system might ask the user if they would like to hear what the house specialties are. Depending on the users response, an additional clip could well be played. The system could also detect if the user appears to be falling asleep and take action accordingly such as by issuing warning message(s) or even disabling the vehicle. The human head tracking system should preferably also be able to detection a direction of gaze and act accordingly—such as by telling the user that the restaurant they are looking for is really on the other side of the street.

B. Voice recognition—Receiving information from the user can be very useful in the functioning of the system. It has already been indicated that there are various levels of information that can be made available. For example, does the driver want to hear about all the restaurants which are in the vicinity or just restaurant featuring a particular type of food. For example, the user could ask the system for the locations of chinese cuisine restaurants and be told that there are none with five miles or along the vehicle's track (if a track has been provided to the GPS system). So the user could be verbally expand the query to include additional cuisines. As another example, the user could say "Get me to 111 Redcliff Avenue and don't bother me unnecessarily en route." In FIG. 2, a speech recognition module 110 has an input to the User Control Interface 24 for the purpose of inputting verbal commands into the system.

C. Expert technology—With expert technology the system can learn from the user and learn about the user's preferences for types of roads, type of restaurants, brands of gasoline, etc., which can be used to filter out less desirable voice clips.

D. Integration with other audio systems. Vehicles typically can have a number of audio systems installed on board, such as radio (satellite and/or land-based) and telephone. Preferably, such systems would be integrated with the present invention to thereby control to types of audio messages supplied to the user. For example, if the radio is being played, then 'push' earcons generated by the system might instead be communicated via a Heads Up Display unit (HUD—see FIG. 1) to the driver, while 'pull' earcons could be prioritized to interrupt the radio (or the radio's volume might be reduced) to allow the earcon to be played. Incoming telephone calls could be prioritized to interrupt earcons, especially 'push' type earcons, and the radio.

Combining these additional features can provide for still further advantages. For example, combining human head tracking ('gaze direction recognition') and voice recognition can be combined to that the system can appropriately respond to an inquiry such as "What is that?" or "What am I looking at?"

From the foregoing description, it will be apparent that the present disclosure has a number of advantages, some of which have been described herein, and others of which are inherent in the embodiments described herein. Also, it will be understood that modifications can be made to the embodiments and method described herein without departing from the teachings of the subject matter described herein. As such, the invention as claimed below is not to be limited to the described embodiments except as required by the appended claims.

What is claimed is:

1. An audio system comprising:
   a position sensor providing current position location information;
   a database for storing a plurality of data records wherein each data item is associated with at least location information and audibly playable information;
   means for querying said database to find one or more data records matching search criteria, the search criteria including at least position information associated with the current position location information;
   an audio processing unit for retrieving the audibly playable information associated with one or more data records found in said database, said audio processing unit generating a spatialized audio cue for at least selected ones of said one or more data records in said database as a function of at least the current position location information provided by said position sensor and the position information associated with the stored data record, the current position information being updated during the generation of said spatialized audio cue and the audio processing unit changing spatialization of the spatialized audio cue in response to changes of the current position information as said spatialized audio cue is generated; and
   audio components for audibly reproducing said spatialized audio cue.

2. The audio system of claim 1 further including: an apparatus for recognizing commands issued by a user of the system, the commands being recognized including at least "yes" and "no" for controlling the delivery of additional audio cues based upon additional data items fetched from said database in response to recognizing a command issued by said user.

3. The audio system of claim 2 wherein the apparatus for recognizing commands includes a speech recognition apparatus.

4. The audio system of claim 1 wherein the position sensor is a global position system (GPS) receiver.

5. The audio system of claim 1 wherein the data items stored in said database correspond to physical landmarks and include information regarding the nature of the landmark.

6. The audio system of claim 1 wherein the means for querying the database includes means for making both "pull" and "push" queries, wherein the "push" queries are generated in response to predetermined search criteria, the search criteria including at least a requirement that the current position location information and the location information associated with data items in said database bear a predetermined positional relationship with respect to one another and wherein the "pull" queries are generated in response to a search query initiated by a user of the audio system.

7. The audio system of claim 6 wherein the predetermined positional relationship comprises a predetermined range requirement.

8. The audio system of claim 6 wherein the predetermined search criteria and the predetermined positional relationship are stored as user preference data in or associated with said database.

9. The audio system of claim 8 wherein the data items stored in said database correspond to physical landmarks and include information regarding a nature of the landmark and information regarding a playback length of the audibly playable information for at least selected ones of said data items.

10. The audio system of claim 1 wherein the audio components include at least four speakers, two of said at least four speakers being disposed to the right and left and forwardly of a user of said audio system and wherein another two of said at least four speakers are disposed to the right and left and rearwardly of said user.

11. The audio system of claim 10 further including:
    an apparatus for recognizing commands issued by said user of the system for controlling the delivery of additional audio cues based upon additional data items fetched from said database in response to recognizing a command issued by said user.

12. The audio system of claim 11 wherein the apparatus for recognizing commands includes a speech recognition apparatus and a user's head position tracking apparatus.

13. The audio system of claim 12 wherein the user's head position tracking apparatus includes a device worn on the user's head which provides information to a laser system regarding a position of the user's head when the user utters a spoken command.

14. The audio system of claim 12 wherein the user's head position tracking apparatus is responsive to head gestures of the user for decoding at least certain head gestures as commands issued to the audio system.

15. A method for enabling location based audio playback comprising:
    storing a plurality of audio clips and associated location information;
    receiving real-time position data of a vehicle, including vehicular orientation data;
    selecting a subset of said plurality of audio clips based on at least said real-time position data; and
    providing spatialized audio in said vehicle for an audio clip in said subset of said plurality of audio clips through the analysis of said real-time position data of a vehicle, including said vehicular orientation data, relative to the location information associated with said audio clip, the spatialized audio having a perceived orientation within said vehicle which coincides with the location information associated with the audio clip and the perceived orientation of the spatialized audio changing in response to changes of said real-time position data while the spatialized audio for said audio clip is being provided in said vehicle.

16. The method of claim 15 further comprising:
    providing a user interface;
    choosing via the user interface a category of audio clips; and
    selecting a subset of said plurality of audio clips based on at least said real-time position data and said category of audio clips.

17. The method of claim 16 wherein selecting the subset of said plurality of audio clips occurs automatically, in at least one mode of operation, as a user drives or steers the vehicle.

18. The method of claim 17 wherein selecting the subset of said plurality of audio clips occurs in response to a user-generated request.

19. A method for providing audio information in a vehicle regarding external landmarks comprising:
    receiving an information signal, said information signal comprising at least a current orientation of the vehicle, said information signal being updated as the vehicle moves relative to said external landmarks;
    producing a spatialized audio signal based on said information signal, wherein said spatialized audio is produced having a spatial orientation within said vehicle which spatially coincides with an associated landmark; and
    wherein the spatial orientation of the spatialized audio signal relative to the associated landmark is updated in response to updates of the information signal while the spatialized audio based on said information signal is being produced within said vehicle.

20. The method according to claim 19 wherein said information signal further comprises current position information of the vehicle.

21. The method according to claim 20 further comprising:
    receiving real-time position information; and
    determining a pre-defined region relative to the current position of the vehicle, wherein the spatialized audio signal is produced only when the landmark is in a pre-determined area.

22. The method according to claim 19 wherein said spatialized audio is produced in said vehicle from at least four speakers, two of said at least four speakers being disposed to the right and left and forwardly of a user in said vehicle and wherein another two of said at least four speakers are disposed to the right and left and rearwardly of said user.

23. The method according to claim 19 further including recognizing commands issued by a user in said vehicle for controlling the delivery of specialized audio information based in response to recognizing a command issued by said user.

24. The method according to claim 23 wherein recognizing commands includes both user speech recognition and user head position tracking.

25. The method according to claim 24 wherein user head position tracking includes providing a device worn on the user's head which provides information to a laser system regarding a position of the user's head when the user utters a spoken command.

26. The method according to claim 25 wherein user head position tracking includes detecting user head gestures for decoding at least certain head gestures as commands issued by the user in said vehicle for controlling the delivery of specialized audio information to the user.

27. A method for providing audio information in a vehicle regarding external landmarks comprising:
    determining a current location of the vehicle;
    retrieving from a database information regarding landmarks located in a vicinity of said vehicle based at least in part on the current location of the vehicle; and
    producing a spatialized audio signal based on the information regarding landmarks retrieved from said database as the vehicle approaches a retrieved landmark, wherein spatialized audio is produced in said vehicle using said spatialized audio signal, the spatialized audio being spatially oriented in a real time fashion relative to a position of the retrieved landmark located externally of the vehicle (i) as the vehicle approaches said retrieved landmark and (ii) while said spatialized audio signal is being produced in said vehicle.

28. The method of claim 27 wherein retrieving information regarding landmarks is further based on predetermined search criteria.

29. The method of claim 27 wherein retrieving information regarding landmarks is further based on user-supplied search criteria.

* * * * *